United States Patent [19]

Rigouard

[11] Patent Number: 4,534,864
[45] Date of Patent: Aug. 13, 1985

[54] PROCESS AND DEVICE FOR THE REGENERATION OF A GROUP OF SOLID PARTICLES HAVING A COATING OF A BIOLOGICAL MATERIAL

[75] Inventor: Alain Rigouard, Echirolles, France

[73] Assignee: L'Air Liquide, Societe Anonyme pour l'Etude et l'Exploitation des Procedes Georges Claude, Paris, France

[21] Appl. No.: 601,333

[22] Filed: Apr. 17, 1984

[30] Foreign Application Priority Data

Apr. 28, 1983 [FR] France .................. 83 07016

[51] Int. Cl.³ ............... C02F 3/28; C02F 3/30
[52] U.S. Cl. ..................... 210/603; 210/614; 210/618; 210/151; 210/218; 48/111; 48/197 A; 435/291
[58] Field of Search ............... 210/618, 617, 616, 150, 210/151, 603, 614, 96.1, 676, 218; 48/197 A, 111; 435/167, 291, 801

[56] References Cited

U.S. PATENT DOCUMENTS

| | | | |
|---|---|---|---|
| 3,788,985 | 1/1974 | Juntgen et al. | 210/676 |
| 3,855,120 | 12/1974 | Garbo | 210/618 |
| 4,055,490 | 10/1977 | Hasegawa et al. | 210/616 |
| 4,284,508 | 8/1981 | Jewell | 210/603 |
| 4,396,402 | 8/1983 | Ghosh | 210/603 |

FOREIGN PATENT DOCUMENTS

| | | | |
|---|---|---|---|
| 0053772 | 6/1982 | European Pat. Off. | |
| 54-115555 | 9/1979 | Japan | 210/618 |
| 7305182 | 10/1974 | Netherlands | |
| 2054549 | 2/1981 | United Kingdom | 210/603 |
| 722852 | 3/1980 | U.S.S.R. | 210/618 |

OTHER PUBLICATIONS

*Biological Fluidised Bed Treatment of Water and Wastewater*, 1981, pp. 234–250, P. F. Cooper et al.

Primary Examiner—Benoît Castel
Attorney, Agent, or Firm—Young & Thompson

[57] ABSTRACT

The solid particles 33' coated with a biological material are developed at the upper end of a bed 32 which is fluidized by a supply of water 3. The particles 33' are removed at 12 and decanted at 11 and the introduced through a pipe 20 at the upper end 22 of an auxiliary anaerobic fermentation column which converts the biological coating into a gaseous mixture which escapes at 27. The regenerated particles are withdrawn at 28 and conveyed at 30 to the purifying bed. Application in the biological purification of waste waters.

7 Claims, 1 Drawing Figure

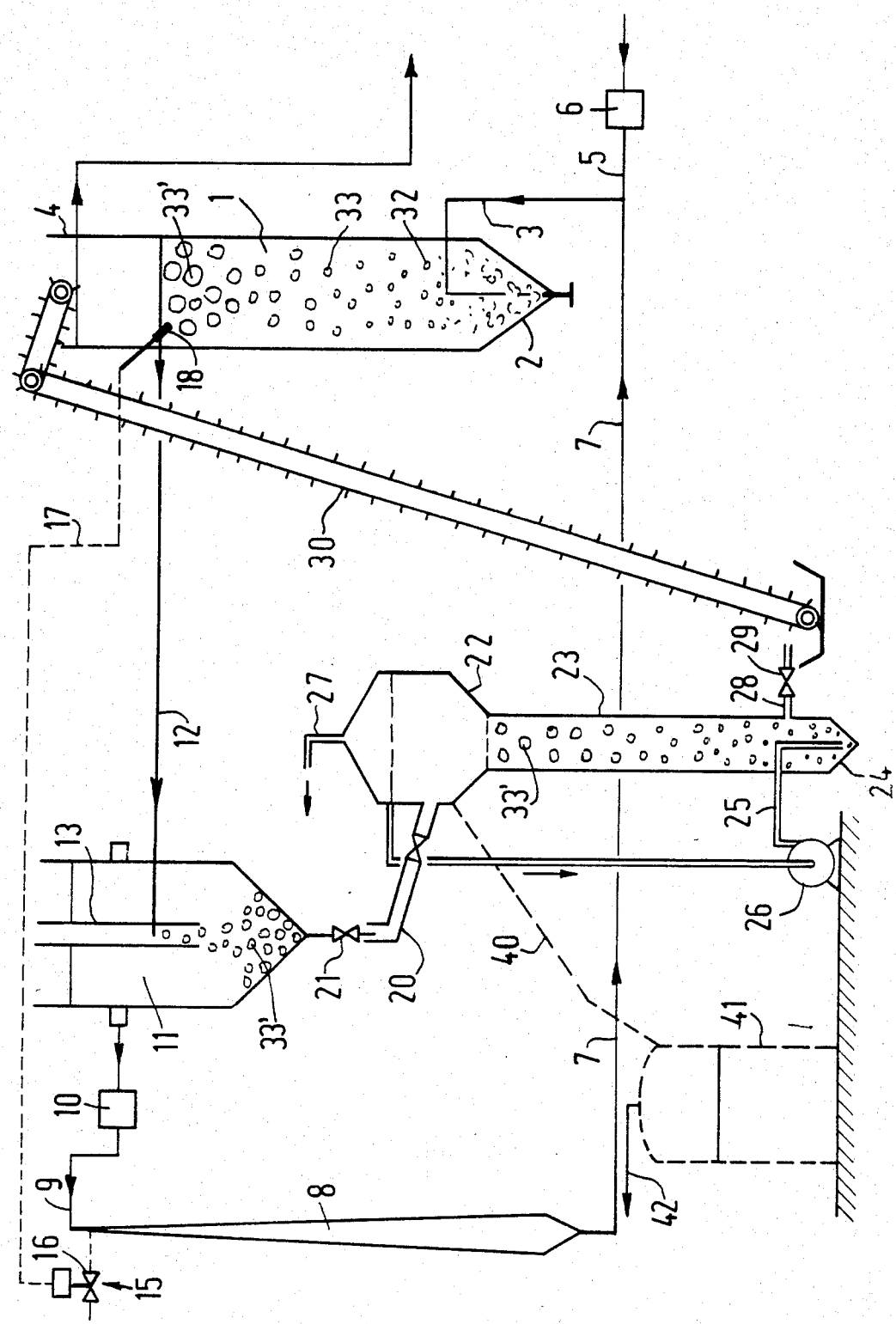

PROCESS AND DEVICE FOR THE REGENERATION OF A GROUP OF SOLID PARTICLES HAVING A COATING OF A BIOLOGICAL MATERIAL

The present invention relates essentially to the purification of waste waters, of the type employing a purifying bed of solid particles fluidized by the water in process of purification, optionally with the recycling of at least a part of the fluidization water current, with the injection of oxygen, preferably in the recycled current of water.

Up to the present time, the coating is biological materials on the particles was separated at the end of the purification by mechanical means employing various techniques such as sifting, cyclones or blows from more or less flexible rotary elements, also with jets of water. This manner of proceeding requires the use of relatively expensive mechanical means which are relatively delicate to use, since mechanical means are required for creating motion.

An object of the present invention is to achieve a regeneration of a group of solid particles possessing a coating of biological material by a substantial elimination of said coating of biological material which is particularily simple and reliable and which moreover ensures an energetic valorization of the biological material thus removed. According to the invention, the process comprises achieving an anaerobic fermentation of the coating of said particles in a bed fluidized in a rising liquid current, degassing at an upper end of the bed a gaseous mixture comprising essentially methane and carbon dioxide resulting from the fermentation, and collecting at a lower end of said bed the regenerated solid particles from which their biological coating has been substantially removed. In this way, the use of mechanical means is avoided by the simple intervention of a fermentation with all the corresponding advantages, in particular from the point of view of the recovery of the gases thus produced which usually include a relatively important combustible component.

The invention also concerns a process for purifying waste waters of the type employing a purifying bed of solid particles fluidized by the water being purified, optionally with a recycling of at least a part of the current of fluidization water, with injection of oxygen, preferably in the current of recycled water, said process comprising taking particles having a biological coating at an upper end of said bed, achieving an anaerobic fermentation of the coating of said particles in a bed fluidized in an ascending liquid current, allowing to degas at an upper end of said bed a gaseous mixture comprising essentially methane and carbon dioxide, and recovering at a lower end of said bed the regenerated solid particles from which their coating of biological material has been substantially removed so as to reconstitute said purifying bed.

The invention will now be described with reference to the accompanying single FIGURE which is a diagrammatic view of a water purifying apparatus according to the invention.

With reference to the FIGURE, a water purifying apparatus comprises essentially a purifying column 1 with a column bottom 2 onto which opens a water supply pipe 3 and an upper end 4 of the column which is open to the surrounding atmosphere. The supply pipe 3 unites a pipe for water to be purified coming from a pipe 5 in which this water is circulated by a pump 6 and a recycled water supply from a pipe 7 leading from a tank of an oxygenation device 8 having a bi-conical shape which the recycled water enters at the upper end through a pipe 9 associated with circulating means 10. This pipe 9 takes water from the upper part of a decanter 11 which is supplied with water taken from the column 1 by a pipe 12 which opens into the decanter 11 in the middle of an axial supply flue 13.

The oxygenation device 8 is associated with means 15 for introducing oxygen, having a valve 16 the closure member of which is controlled by a control 17 having means 18 for measuring the oxygen content, 18, in the treating column 1.

The lower end of the decanter 11 is connected by a large pipe 20 having a closure member 21 to an upper enclosure 22 of an auxiliary regeneration column 23 whose lower end 24 is connected through a recycling pipe 25 to a pump 26 which draws off a fluidization liquid, for example water, from the upper enclosure 22. The upper enclosure 22 is provided with a gas withdrawing pipe 27, and the lower end 24 of the auxiliary column 23 is connected by a large pipe 28 having valves 29, to means for reintroducing particles 30 which may be a vertical conveyor, for example a hydro-ejector employing the treated water as the carrier fluid.

The apparatus operates in the following manner. The water to be purified is introduced in the known manner into the apparatus through the pipe 5 and mixed with a large supply of water recycled through the pipes 7 and 9 and oxygenated by the device 8 and introduced into the purifying column 1 in which occurs an aerobic fermentation or particles 33 in an upwardly moving bed 32. In the known manner, micro-organisms deposited on the outer periphery of the particles produce a coating of biological material and result in the purifying phenomenon. This coating must of course be eliminated and, for this purpose, the thus coated particles, which are the lightest and are shown at 33' at the upper end of the bed, are entrained by the recycling water to the decanter 11 where these particles 33' settle on the bottom of the decanter while the recycling water is conveyed, through the pipe 9 and the pump 10, to the oxygenation device 8. The particles which gather at the bottom of the decanter 11 are withdrawn in a discontinuous or continuous manner through the pipe 20 and are supplied to the auxiliary anaerobic fermentation pipe 23. Also established in this column 23 is a slowly settling bed of said particles of 33' produced by a current of recycled water conducted by the pipe 25 and the pump 26 with no supply of oxygen. Anaerobic fermentation results in the suspended bed which converts the biological coating into gaseous products such as methane and carbon dioxide which escape through the pipe 27. The particles from which their coating has been removed therefore have their density increased and gradually descend to the bottom 24 of the column 23 from which they are taken continuously or discontinuously by the pipe 28 and supplied to the conveyor 30 which reintroduces them into the main water purifying column.

According to a modification of the manner of carrying out the invention, there is provided during the treatment in the auxiliary regeneration column 23 a pipe 40 for extracting biological sludge at the top of the column and supplying it to a digester 41 where the sludge has time to be completely mineralized and here again gives off at 42 carbon dioxide and methane.

What is claimed is:

1. A process for regenerating a group of solid particles provided with a coating of biological material by substantially eliminating said coating of biological material, said process comprising producing and anaerobically fermenting the coating of said particles in a bed fluidized in an ascending current of liquid, degassing at an upper end of said bed a gaseous mixture comprising essentially methane and carbon dioxide resulting from said fermentation, and recovering at a lower end of said bed the regenerated solid particles from which their coating of biological materials has been substantially removed.

2. A process according to claim 1, wherein said liquid is water which is recycled by a pump.

3. A process according to claim 1, comprising withdrawing at the upper end of the fluidized bed biological sludge which is conveyed to a digester.

4. A process for purifying waste waters, employing a purifying bed for solid particles fluidized by the water being purified, with a recycling of at least a part of a current of said fluidizing water, with injection of oxygen, and wherein particles provided with a biological coating are removed at an upper end of said bed so as to remove their coating and are thereafter reinjected into the purifying bed, said removal of the coating being effected by an anaerobic fermentation in a bed fluidized in an ascending current of liquid, with degassing at an upper end of said bed of a gaseous mixture comprising essentially methane and carbon dioxide, and recovering at the lower end of said bed the regenerated solid particles from which their coating of biological material has been substantially removed so as to reconstitute said purifying bed.

5. A process according to claim 4, wherein said oxygen is injected in the recycled current of water.

6. An apparatus for purifying waste waters, comprising a main column incorporating solid particles coated with biological material, a water supply inlet adjacent the lower end and a withdrawing outlet adjacent the upper end of the column, a decanter, a pipe connecting said upper outlet to the decanter which is provided with a lower withdrawing pipe, an auxiliary column of water for anaerobic fermentation to which said lower withdrawing pipe is connected, means for degassing at the upper end of said auxiliary column a gas comprising essentially methane and carbon dioxide, means for recycling water from an upper portion of said auxiliary column to a lower portion thereof, means for removing particles at the lower end of said auxiliary column and reinjecting them into the main column, and a connecting pipe between the upper end of the decanter and a water oxygenation means which has an outlet connected to the lower end of the main column.

7. An apparatus according to claim 6, further comprising a connecting pipe between the upper end of the auxiliary column and a digester.

* * * * *